United States Patent [19]

Ladner et al.

[11] Patent Number: 4,909,739
[45] Date of Patent: Mar. 20, 1990

[54] INTERACTIVE TYPING/TRAINING SYSTEM

[76] Inventors: Eugenia A. Ladner, Rte. 2, Box 760; Craig P. Williams, 810 Byrd St., both of Abilene, Tex. 79601

[21] Appl. No.: 266,368

[22] Filed: Nov. 2, 1988

[51] Int. Cl.$^4$ ............................................. G09B 13/00
[52] U.S. Cl. .................................................... 434/233
[58] Field of Search ......................................... 434/233

[56] References Cited

U.S. PATENT DOCUMENTS 2,570,908  10/1951  Behr .................................... 434/233
3,501,849  3/1970  Olsen .................................. 434/233

OTHER PUBLICATIONS

*Newsweek*, Jul. 20, 1964, p. 55, "Automated Teachers..".

Primary Examiner—William H. Grieb
Attorney, Agent, or Firm—Richards, Medlock & Andrews

[57] ABSTRACT

A keyboard instruction system (10) is disclosed which uses a left hand finger guide (12) and a right hand finger guide (14). The finger guides have a color coding for each finger on the hands and the character representing the home key that each finger is to be used for in touch typing. Overlays, bearing large, highly visible key symbols are placed on the keys of the keyboard in colors corresponding to the color coding of the finger guides so that it is clear which keys each finger should be used for.

8 Claims, 1 Drawing Sheet

U.S. Patent   Mar. 20, 1990   4,909,739
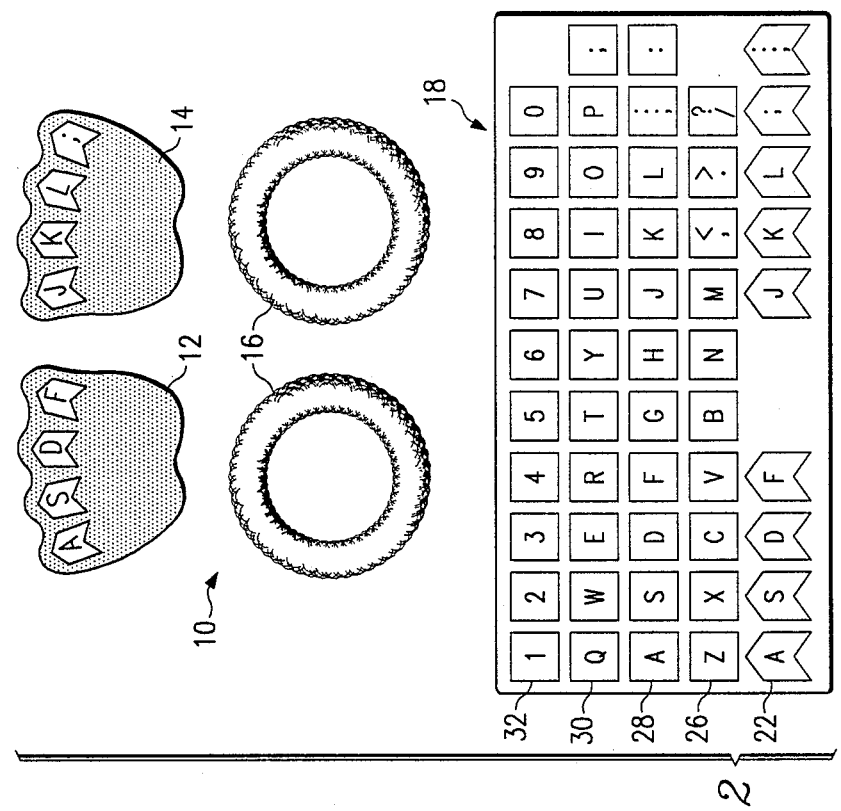
FIG. 2
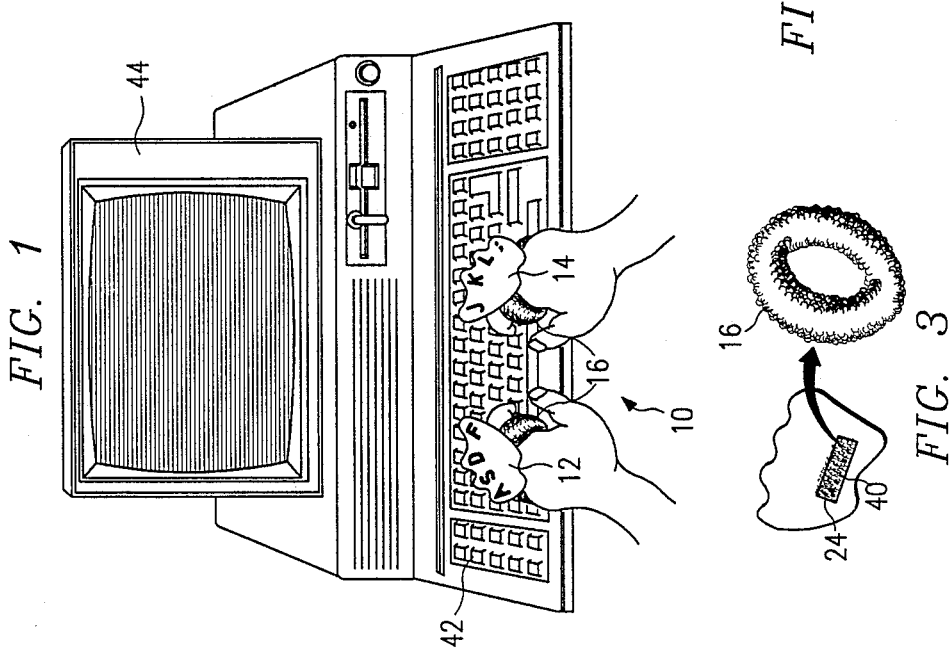
FIG. 1
FIG. 3

INTERACTIVE TYPING/TRAINING SYSTEM

TECHNICAL FIELD

This invention relates to keyboard training for computors and typewriters, and particularly to training suitable for young children.

BACKGROUND OF THE INVENTION

For many decades, the positions of keys on a typewriter keyboard has been standardized. This standardization has been incorporated into the design of keyboards for interaction with computers, with computers becoming ever more important in our society.

The most widely accepted method for efficient keyboard input is the touch typing procedure. In this procedure, the typist places the fingers on the correct home keys across the width of the keyboard, which read "ASDFJKL;" from left to right. The thumbs are placed over the space bar. Each finger rests lightly on its home key and does not move unless it reaches to strike keys immediately above or below the home key or, in the case of each of the index fingers, the additional four keys immediately to the side of the home key, the finger quickly returns to its home key. Thus, each finger has only certain keys that it should strike.

To keyboard correctly, the typist must use the touch typing procedure described above. There is no middle ground in proper typing. If the typist is not typing correctly, he is typing incorrectly.

Keyboarding has a been a skill taught at the high school level heretofore. Many suitable teaching systems exist for students of that level. However, the explosive growth in the use of computers has reached as far down as elementary school and students as young as kindergarteners are now using a computer keyboard to work various computer programs. Even if a program requires the striking of only one or two keys in the keyboard, the students are striking keys with the wrong fingers and using other incorrect keyboarding techniques. Typing teachers agree that students who form incorrect keyboarding techniques are extremely difficult to retrain. It is much more difficult to teach a student who has ingrained, incorrect habits of keyboarding than to teach a student who has never used the keyboard. Breaking incorrect habits is frustrating and next to impossible in many cases.

Students in elementary school now have to cope with the keyboard. Keys are not in alphabetical order and even locating a key many times is difficult, to said nothing of attempting to strike keys with the correct finger. Frankly, the keyboard is an overwhelming mystery to these students. Moreover, the poor habits that they learn at this age will significantly hamper their ability to learn correct typing procedure.

One attempt to provide a keyboard teaching system is disclosed in U.S. Pat. No. 3,501,849 issued on Mar. 24, 1970 to Mildred Olsen. The main purpose of Olsen's disclosure was to instruct handicapped children in language art skills, with any touch typing training basically a byproduct. The Olsen patent requires the use of eight colored adjustable finger bands color-coded to match colored decals on the keys. However, the Olsen patent does not provide guidance for the learner to correctly place the fingers on the home keys. Finger band color and key color can be matched in numerous incorrect placements of fingers on the keybord in the Olsen patent. Incorrect initial placement of fingers totally negates the touch typing system. The use of eight adjustable bands by young children in a classroom environment is also not very practical. With eight bands, these students are quite likely to place the bands on the wrong fingers, and it becomes extremely time consuming for a teacher to check all eight fingers on each student in a classroom and also takes substantial time to sort out the rings on each student if they are put on wrong. The bands are easily dropped by children and storage and retrieval of bands are not efficiently manageable. Therefore, a need exists for a keyboard training system which is more suited toward younger children to properly teach them keyboard operation before they develop improper typing habits which are difficult or impossible to break.

SUMMARY OF THE INVENTION

In accordance with one aspect of the present invention, a keyboard instruction system is provided for teaching a user proper touch typing on the keys of a keyboard. The system includes a left hand finger guide having a color code to identify each finger on the left hand and a right hand finger guide having a color code to identify each finger on the right hand. Structure is provided for securing the left and right hand finger guides on the left and right hands of the user, respectively. Structure is provided for color coding the keys on the keyboard, with the keys to be operated by a predetermined finger having the same color code as said predetermined finger.

In accordance with another aspect of the present invention, the structure for securing the finger guides on the hand are resilient bands pulled over the fingers of the user to the top of the hand. The finger guides can be secured to the bands by cooperating hook and loop elements.

In accordance with another aspect of the present invention, each color code on the finger guides is identified by the home key letter for the finger represented by the color code. The little finger on each hand is identified by a shade of pink to assist the children in positioning the finger guides properly.

BRIEF DESCRIPTION OF THE DRAWINGS

For a more complete understanding of the present invention, and the advantages thereof, reference is now made to the following description taken in conjunction with the accompanying drawings, in which:

FIG. 1 is a perspective view of the keyboard instruction system used on the keyboard;

FIG. 2 is an illustrative view of the components of the keyboard instruction system; and FIG. 3 is a perspective view of the finger guide and band showing their interaction.

BRIEF DESCRIPTION OF THE APPENDIX

For a more complete understanding of the present invention, and the advantages thereof, reference is now made to the Appendix, in which:

The Appendix is a source code listing of one embodiment of a computer program for interactive keyboard training with the other components of the keyboard instruction system.

DETAILED DESCRIPTION

With reference now to the accompanying drawings, there is illustrated a keyboard instruction system 10 forming a first embodiment of the present invention. The system includes a left hand finger guide 12, a right hand finger guide 14, two resilient bands 16 and a sheet 18 of adhesive backed appliques.

As best seen in FIG. 2, the left and right hand finger guides 12 and 14 are shaped somewhat similar to the human fist with knuckles 20. On the left hand finger guide 12, the letters ASDF are printed from left to right across the guide, representing the home keys for the four fingers of the left hand. The right hand finger guide has printed thereon the letters JKL; from left to right representing the home keys for the right fingers. Colored appliques from Row 22 of sheet 18 are removed from the sheet and placed over the corresponding letters on the finger guides to identify each home key with a particular color. Alternatively, the guides themselves can be printed with colors representing those corresponding to each home key. The little finger on each hand is preferably represented by a shade of pink color so that a child can easily relate the pink color to their "pinky" finger.

On the back of each guide is secured a mat 24 having plastic hooks 40 (See FIG. 3). These hooks will engage loops formed on the bands 16 to secure a guide on a band. Cooperating hooks and loops of this type are of the type sold under the trademark Velcro. When the guides have been mounted on the bands, the child can simply slide the band over the fingers up to the top of the hand, as best illustrated in FIG. 1.

The remaining appliques in rows 26, 28, 30 and 32 of sheet 18 are applied to their respective characters on the keyboard. As illustrated in FIG. 2, each vertical column, such as 1QAZ, is a uniform color, indicating to the child that the finger color coded to that color is to be used to hit those characters. The characters on the appliques can be oversize, bold, and highly visible to aid the children in key location. In the preferred embodiment, the disribution of colors in each column is as follows, with the columns identified by the numeral heading each column.

Column 1: Dark pink
Column 2: Yellow
Column 3: Violet
Column 4: Green
Column 5: Green
Column 6: Orange
Column 7: Orange
Column 8: Blue
Column 9: Gray
Column 0: Light Pink
Unnumbered Column: Light Pink An essential element of the present invention is the finger guide on each hand. The finger guide marks each finger with a color and its respective home key letter. Immediately, the user can match the color and letter of each finger to the matching home key and place the fingers in their home key positions ready to begin typing. This home key position is essential to touch typing. The fingers must be placed initially on these keys before typing begins to ensure proper technique.

To strike any key on the keyboard correctly, the user then has only to match the color of his finger to the color of the key. Matching colors is quite easy and even fun for young children. The keyboard thus has a system, organization and division. Deciding which finger to use is no longer an impossible task, but a task that is easily mastered and fun to a young child.

Since students are limited in time available for keyboard drills and the fine motor movements of kindergarten and first graders are not sufficiently developed for difficult keyboard drills, the guides are invaluable to giving them the guidance required to keyboard correctly and prevent their developing incorrect keyboarding skills. As shown in FIG. 1, keyboard 42, on which system 10 is used, is the keyboard interface to a computer 44. Programs, such as that presented in the Appendix, can be stored in the computer 44 to provide for the teaching of proper typing techniques using the color coded system to create an enhanced interactive keyboard training system with the program providing lessons which interact with the guides and appliques to teach typing, in addition to programs directed to teaching a particular subject.

Touch typing in the past has primarily applied to typewriter keyboards, with the typist's typing from copy, dictation or their own thoughts. Today, students are utilizing computer programs for instruction in numerous academic subjects and other areas. These programs require them to focus mentally on the tasks involved in the teaching software, not in correct typing procedure. When a student is expected to follow the subject matter of the academic subject, it is an overload to expect the student to concentrate on proper keyboarding technique as well. However, with the colored finger guides and keys, the student needs little conscious thought to use proper keyboard technique. It is the consensus of teachers that even though students may keyboard correctly while utilizing software drills, when the drills are over, students quickly revert to incorrect techniques. It takes many hours of practice over a period of time for a student to train the fingers to become a touch typist. Since elementary students do not have the time, nor maturity to master this skill, they need help to keyboard correctly. The finger guides and key overlays provide this assistance.

The finger guides are easy to put on, and, if a student places it on incorrectly, it is very easy to remedy. The child needs only to remember knuckles 20 toward the keyboard and pink color over their "pinkies". A teacher can very quickly check the whole classroom for proper placement of the guides to minimize the time used in preparation and maximize teaching time.

While only one embodiment of the present invention has been illustrated in the accompanying drawings, and described in the foregoing Detailed Description, it will be understood that the invention is not limited to the embodiment disclosed, but is capable of numerous rearrangements, modifications and substitutions of parts and element without departing from the spirit of the invention.

We claim:

1. A keyboard instruction system for teaching a user proper touch typing technique on the keys of a keyboard of a computer, comprising:
a left hand finger guide having a color code to identify each finger on the left hand, and the home key letter marked thereon for each finger;
a right hand finger guide having a color code to identify each finger on the right hand, and the home key letter marked thereon for each finger;
means for securing the left hand finger guide to the left hand of the user;
means for securing the right hand finger guide to the right hand of the user; and means for color coding the keys on the keyboard, with the keys to be operated by a predetermined finger having the same color code as said predetermined finger on said finger guide, the marking of the home key letter for each finger causing the fingers to be placed on the home keys prior to typing.

2. The keyboard instruction system of claim 1 wherein said securing means are resilient bands pulled over the fingers of the user's hand to the top of their hand.

3. The keyboard instruction system of claim 1 wherein the little fingers of each hand are identified by a pink color.

4. The keyboard instruction system of claim 1 wherein each finger guide is attached to said securing means by a mat of hooks secured to said finger guide and cooperating loops on said securing means.

5. The keyboard instruction system of claim 1 wherein each finger guide has the shape of a fist with knuckles to assist the user in proper placement of the finger guide on the hands.

6. A keyboard instruction system for teaching a user proper touch typing technique on the keys of the keyboard of a computer, comprising:
- a left hand finger guide having a color code to identify each finger on the left hand and a letter representing the home key for each finger;
- a right hand finger guide having a color code to identify each finger on the right hand and a letter representing the home key for each finger;
- a resilient band for each hand fit over the fingers to the top of the hand;
- means for securing each finger guide to one of said bands;
- means for color coding the keys on the keyboard, with keys to be operated by a predetermined finger having the same color code as the predetermined finger on said finger guide.

7. The keyboard instruction system of claim 6 wherein the color coding for each little finger is a shade of pink to assist a child in properly positioning the finger guides on their hand.

8. A keyboard instruction system for teaching a user proper touch typing technique on the keys of a keyboard of a computer, comprising
- a left hand finger guide having a color code to identify each finger on the left hand, and the home key letter marked thereon for each finger;
- a right hand finger guide having a color code to identify each finger on the right hand, and the home key letter marked thereon for each finger;
- means for securing the left hand finger guide to the left hand of the user;
- means for securing the right hand finger guide to the right hand of the user;
- means for color coding the keys on the keyboard, with the keys to be operated by a predetermined finger having the same color code as said predetermined finger on said finger guide; and
- software in the computer providing keyboard instruction teaching interactive with said finger guides and color coding means, including the display of the home key letter with the associated color to cause placement of the fingers on the home keys.

* * * * *

UNITED STATES PATENT AND TRADEMARK OFFICE
CERTIFICATE OF CORRECTION

PATENT NO. : 4,909,739
DATED : March 20, 1990
INVENTOR(S) : Eugenia A. Ladner and Craig P. Williams It is certified that error appears in the above-identified patent and that said Letters Patent is hereby corrected as shown below:

Column 1, line 24, after "key," insert --above and below. If it reaches out to strike another key,--.

Column 1, Line 50, delete "said" and insert therefore --say--.

Column 6, line 13, after "comprising" insert --:--.

Signed and Sealed this

Sixteenth Day of July, 1991

*Attest:*

HARRY F. MANBECK, JR.

*Attesting Officer*     *Commissioner of Patents and Trademarks*